United States Patent

Kaminstein

[11] 4,316,926
[45] Feb. 23, 1982

[54] NON-SLIP MATERIAL FOR THE HAND

[76] Inventor: Bernard Kaminstein, 329 Franklin Pl., Paramus, N.J. 07652

[21] Appl. No.: 6,460

[22] Filed: Jan. 25, 1979

[51] Int. Cl.³ .............................................. B32B 3/10
[52] U.S. Cl. .................................... 428/137; 428/138; 428/247; 428/252; 428/253; 428/262; 428/343; 428/354; 428/355; 428/306.6; 428/316.6
[58] Field of Search .............. 428/245, 296, 247, 253, 428/254, 255, 262, 311, 343, 354, 355, 131, 137, 138, 252

[56] References Cited

U.S. PATENT DOCUMENTS

| 3,085,572 | 4/1963 | Blackford | 428/343 |
| 3,364,063 | 1/1968 | Satom | 428/343 |
| 3,466,187 | 9/1969 | Heinemann | 428/343 |
| 3,562,088 | 2/1971 | Neuman et al. | 428/343 |
| 3,665,543 | 5/1972 | Nappi et al. | 428/343 |
| 3,748,217 | 7/1973 | May et al. | 428/311 |
| 3,788,882 | 1/1974 | Noone | 428/311 |
| 3,842,832 | 10/1974 | Wideman et al. | 428/311 |
| 3,873,638 | 3/1975 | Olson | 428/343 |
| 3,993,833 | 11/1976 | Esmay | 428/311 |
| 4,008,350 | 2/1977 | Crawford et al. | 428/311 |
| 4,018,957 | 4/1977 | Werner et al. | 428/262 |
| 4,024,312 | 5/1977 | Horpman | 428/343 |
| 4,053,676 | 10/1977 | Kominstein | 428/310 |
| 4,061,820 | 12/1977 | Mazid et al. | 428/311 |
| 4,084,030 | 4/1978 | Goodale et al. | 428/311 |
| 4,104,430 | 8/1978 | Fenton | 428/311 |
| 4,234,649 | 11/1980 | Ward | 428/343 |

Primary Examiner—James J. Bell
Attorney, Agent, or Firm—Stephen E. Feldman; Marvin Feldman; Steve T. Zelson

[57] ABSTRACT

A non-slip material is disclosed which is useful as a handle grip covering, which comprises a curvilinear surface of a cellular or porous web of material, which curvilinear surface is coated with a tackifier resin. Said layer being optionally carried by a supporting substrate such as paper, film, metal or preferably a vinyl foam and a wear resistant and tacky coating on at least the upper surfaces of the strands or walls of said cellular layer.

10 Claims, 4 Drawing Figures

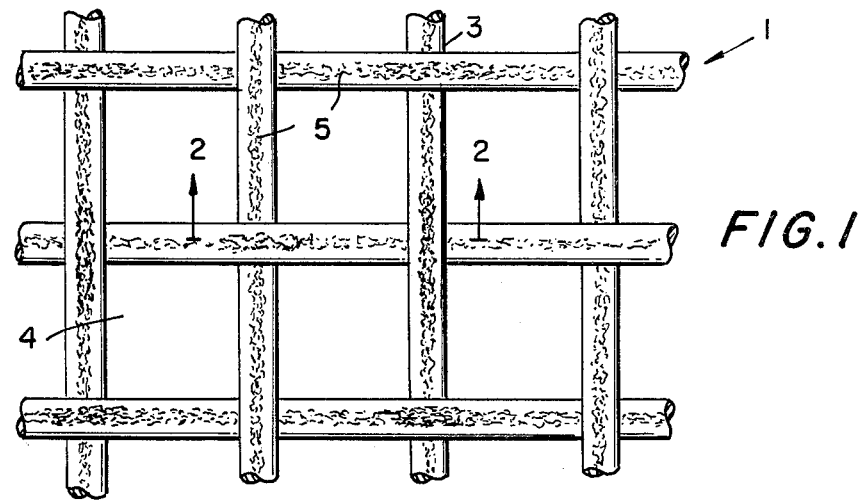
FIG. 1
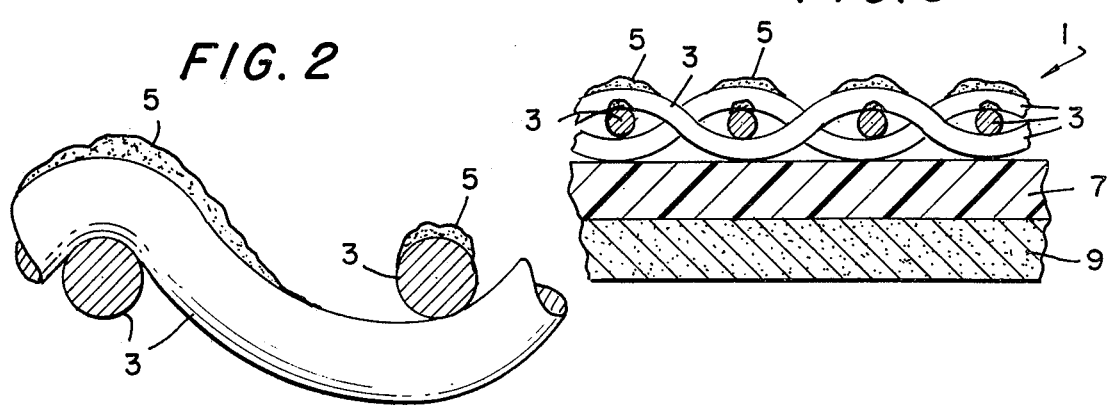
FIG. 2
FIG. 3
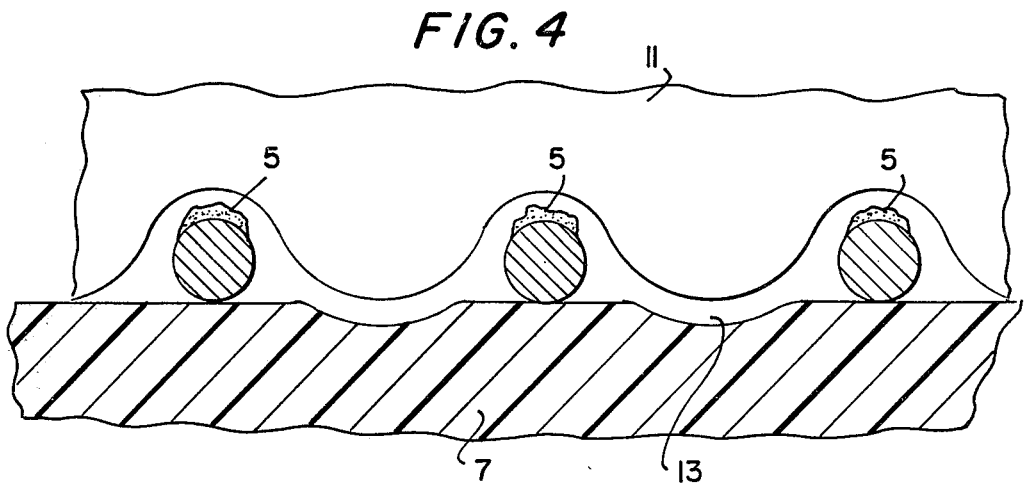
FIG. 4

NON-SLIP MATERIAL FOR THE HAND

FIELD OF THE INVENTION

This invention relates to a material which may be applied to the handle or surface of an object for the purpose of improving the ability to grip the object, specifically this invention relates to a non-slip material which is applied to handles to permit a slip-resist grip.

DESCRIPTION OF PRIOR ART

U.S. Pat. No. 4,053,676, which issued on Oct. 11, 1977, to the same inventor as the present invention, describes a coating including expanded microspheres which are adapted to be applied to a surface so as to increase the coefficient of friction thereof. Such coating overcame the prior art leather or friction tape wrapping, but required specialized expandable microspheres.

There is now provided by the present invention a non-slip material which avoids the problems in the prior art wrappings and materials.

A principal object of the present invention is to provide a non-slip surfacing material and more particularly a handle grip material which provides an irregular, tacky surface capable of conforming to a human grip.

It is another object of this invention to provide a non-slip material which is readily useful with open-weave fabric constructions.

It is another object of this invention to provide a non-slip material which is readily manufactured of relatively inexpensive materials and yet is safe and practical in design and in its intended use.

The aforesaid as well as other aspects and advantageous as will become apparent from a reading of the following specification, the adjoined claims and the drawings in which:

FIG. 1 is a schematic view showing a cellular layer of the present invention;

FIG. 2 is a cross-sectional view taken on line 2—2 of FIG. 1;

FIG. 3 is a showing of the cellular layer with a supporting substrate; and

FIG. 4 is a schematic in partial cross-section showing the surface of a hand engaging the member.

DESCRIPTION OF THE PREFERRED EMBODIMENTS

The foregoing and other objects are achieved in the preferred embodiment of the present invention by coating a cellular member such as cloth with a wear resistant and tacky resinous coating. The cloth has a pick in the range of 5 to 50 strands per inch thereby providing an irregular compressible surface. The strands are preferably formed from a combination of natural and synthetic fibers. The combined fibers have a different hold-out characteristics for the subsequently applied tack and wear resistant coating, and due to this differential in absorption, the subsequently applied wear tacky coating undulates further increasing the irregularity of the surface.

The cellular member is preferably supported by a vinyl foam supporting substrate which, optionally, may have an adhesive backing thereon. The compressible foam further enhanced the invention's capability of conforming to the shape of a hand grip.

Referring to FIG. 1, a woven cloth 1 is shown, having inter-woven threads forming openings 4 between the threads. As illustrated in FIGS. 1 and 2, the upper surface of the threads 3 have a coating 5 thereon which comprises a tacky resinous.

As illustrated in FIG. 3, the cloth material is adhered to a vinyl foam substrate 7 having a pressure sensitive adhesive backing 9 for readily attaching the structure to the surface of an article.

As shown in FIG. 4, the surface of hand 11 is shown interlocking with the non-slip member shown in FIG. 3. Coating 5 is tacky and resists movement. The openings between strands 5 allow the skin of the hand to interlock therewith. The compressibility of the foam 7 enhances the interlock and conforms to irregularity in the surface of hand 11.

Cloth 1 is illustrated as being woven but it is to be understood that the same may be knitted, or otherwise formed to form an open structure. The size of the openings should be such as to allow an interlocking as illustrated in FIG. 4. Generally, this can be accomplished by maintaining the openings a range between 5 to 50 picks per inch.

It is not essential to use cloth as other porous structure can accomplish the function. For example, embossed or perforated paper or film could accomplish the function. It is preferred, however, that the walls forming the pores or cells of the structure be compressible to a degree so as to assist in assuring skin contact such as illustrated at 9 in FIG. 4.

Strands 3 are preferably formed from a combination of fibers which have different absorption characteristics for the tackifying resin 5. Generally, this can be accomplished by using threads formed from a combination of e.g. natural and synthetic fibers.

That is to say the coating composition of the present invention may comprise:

a. a base resin;
b. a plasticizer for the base resin; and
c. a tackifier for the base resin.

It is to be borne in mind that quite often the plasticizer serves as the tackifier as well, and such plasticizer-tackifier are thus useful.

Suitable resins include polyvinyl esters (e.g. polyvinyl acetate homopolymers and copolymers); polyacrylics (e.g. polymethylmethacrylate); polystyrene; polybutadienes and copolymers thereof such as the block copolymers (e.g. carboxymodified butadiene-acrylonitrite); polyvinylhalogens (e.g. polyvinyl chloride); polyvinylidene chloride; polynitrites; neoprene; and the like.

The plasticizer-tackifiers which may be used, are compositions well known in the art include among others, for instance, tricresyl phosphate, dibutyl phthalate, dioctyl phthalate, polycarboxylic acid polyesters of a nuclearly halogenated aryl ether alcohol, for instance, di-(para-chloropheylethyl) sebacate, etc.; butyl phthalyl butyl glycolate, dioctyl sebacate, di-(2-ethylhexyl) tetrachlorophthalate, ethylene, glycol dioleate, polyester plasticizer, e.g., the Paraplexes, etc.

The tackifying resin 5 can be selected from any resinous material which has good wear resistance and exhibits tackiners at room temperature.

A particularly suitable resin for this purpose is nitrile latex made by Goodyear Tire and Rubber Company. The resin is sold as the 520 series and is carboxymodified butadiene-acrylonitrile copolymer latex. Selected acrylic copolymers can also be utilized. In addition, the same effect can be achieved within a wide range of selected resins by plasticizing the same and/or by adding a tackifier. As mentioned plasticizer-tackifiers are well known additives for pressure sensitive adhesives as, e.g., described on page 586 of the *Handbook of Adhesives*, Irving Skeist, Van Nostand Reinhold Co., NY, NY (1962). The pressure sensitive adhesives hereinabove referred to can also be utilized but only to the extent a reduction in the amount of tackifier in the coating composition.

The coating of the present invention may be applied by a suitable method known to one in the art including rolling, spraying, brushing and the like. It is preferrably desirable to coat only the top most part of the fiber strands as shown in the drawings while leaving the material between the strands (i.e. open-weave) without coating so that the hand can be better accomodated on the grip.

There has accordingly been described herein in novel handle wrapping material which provides a non-slip grip to the handle.

While there has been described certain preferred embodiments, various modifications can be made with the scope and spirit of the invention and defined in the adjoined claims.

What is claimed is:

1. A non-slip material for the hand comprising, a web being formed with a plurality of pores, wherein said pores are sufficiently large so that the flesh of the hand will press into said pores when pressed against one surface of said web;

a coating comprising a tackifier being disposed on said one surface of the web but not on opposed web portions forming the inner periphery of said pores, so that when the hand presses onto the one surface, part of the flesh of hand is free to move into the pores while another part on the hand is retained on the one surface by said coating; and a supporting substrate, and means to bond the opposite surface of the web to said substrate; said substrate being formed so as to engage a handle to be gripped and wherein said substrate is compressible, so that the part of the flesh of the hand in moving into the pores compresses the substrate and provides a slip-resistant grip to the handle.

2. The non-slip material is defined by claim 1, said coating comprising a resin and a plasticizer for the resin wherein the plasticizer renders the resin tacky.

3. The non-slip material as defined by claim 2, said coating being disposed comprising only on one surface of the web so as not to fill the pores.

4. The non-slip material as defined by claim 1, said web comprising perforated paper.

5. The non-slip material as defined by claim 1, said web material being plastic.

6. The non-slip material as defined by claim 2, said web material comprising interwoven fibers comprising at least one selected from natural and synthetic fibers.

7. A non-slip material as defined by claim 1, said supporting substrate being a foam material.

8. The non-slip material of claim 1, wherein said web comprises a woven fabric, the picks per inch being between 5 to 50 picks per inch.

9. Thereof the non-slip material as defined by claim 8, said woven fabric comprising strands formed from natural and synthetic fibers spun together.

10. The non-slip material of claim 1, said web being formed of fibers of circular cross-section, and wherein said coating is only on about a portion of the outside surface of the fibre, that coated portion of the outside surface being said one surface.

* * * * *